N. BROOKS.
Button-Swivel.
No. 196,135. Patented Oct. 16, 1877.
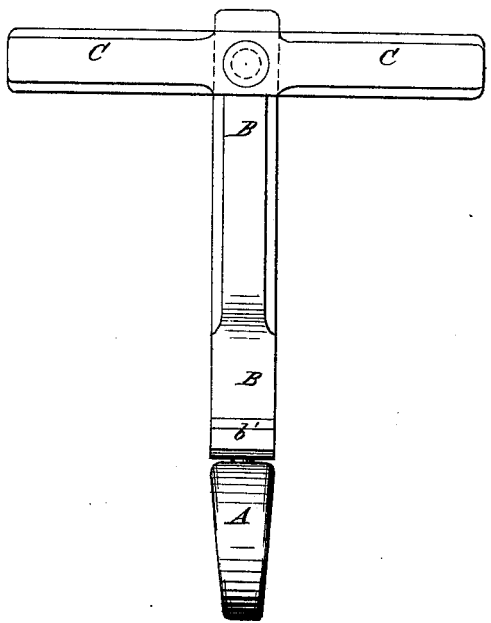
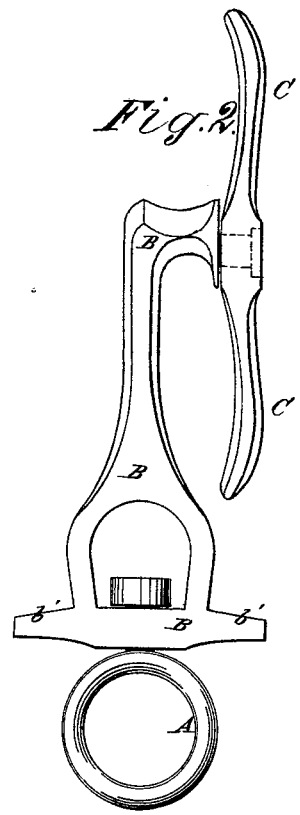
WITNESSES:
INVENTOR:
N. Brooks.
BY
ATTORNEYS.

UNITED STATES PATENT OFFICE.

NORMAN BROOKS, OF CLIFTON, KANSAS.

IMPROVEMENT IN BUTTON-SWIVELS.

Specification forming part of Letters Patent No. 196,135, dated October 16, 1877; application filed September 1, 1877.

*To all whom it may concern:*

Be it known that I, NORMAN BROOKS, of Clifton, in the county of Washington and State of Kansas, have invented a new and useful Improvement in Button-Swivels, of which the following is a specification:

Figure 1 represents my improved device in position for use. Fig. 2 represents the same in position for being inserted in the ring.

Similar letters of reference indicate corresponding parts.

The object of this invention is to furnish an improved device designed especially for connecting a lariat or tether with the ring of a headstall, and which shall be simple in construction and convenient and reliable in use.

The invention consists in the combination of the swivel-ring, the hook having a cross-head or projecting arms formed upon the end of its shank, and the pivoted button, with each other, as hereinafter fully described.

A represents a ring, into which the lariat or tether is tied or otherwise secured, and which is swiveled to the shank of the hook B. To the head or point of the hook B is pivoted a button, C, by a rivet, so that the button C may be turned across the hook, or lengthwise with it, as may be desired.

In using the device, the button C is turned lengthwise with the hook B, and the button and hook are passed through the ring of the headstall, and the button is then turned across said ring. The device is detached by reversing this operation.

Upon the end of the shank B is formed a cross-head or projecting arms, $b'$, to prevent the device from passing through the headstall-ring and being lost, should the lariat or tether become detached or be broken.

Having thus described my invention, I claim as new and desire to secure by Letters Patent—

The combination of the swivel-ring A, the hook B, having a cross-head or projecting arms, $b'$, formed upon the end of its shank, and the pivoted button C, with each other, substantially as herein shown and described.

NORMAN BROOKS.

Witnesses:
   H. R. HAYNES,
   WM. FUNNELL.